United States Patent
Joo et al.

(10) Patent No.: US 9,492,739 B2
(45) Date of Patent: Nov. 15, 2016

(54) VIRTUAL WORLD PROCESSING APPARATUS

(71) Applicant: ELECTRONICS AND TELECOMMUNICATIONS RESEARCH INSTITUTE, Daejeon (KR)

(72) Inventors: Sang Hyun Joo, Daejeon (KR); Hae-Ryong Lee, Daejeon (KR); Hyung-Gi Byun, Yongin (KR); Jeong-Do Kim, Yongin (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 449 days.

(21) Appl. No.: 14/058,018

(22) Filed: Oct. 18, 2013

(65) Prior Publication Data
US 2014/0113715 A1   Apr. 24, 2014

(30) Foreign Application Priority Data

Oct. 19, 2012  (KR) .................. 10-2012-0116414
Oct. 19, 2012  (KR) .................. 10-2012-0116416
Jun. 21, 2013  (KR) .................. 10-2013-0071830

(51) Int. Cl.
*A63F 13/00*    (2014.01)
*B05B 12/02*    (2006.01)
*A63F 13/98*    (2014.01)
*A63F 13/40*    (2014.01)

(52) U.S. Cl.
CPC ............... *A63F 13/00* (2013.01); *A63F 13/02* (2013.01); *A63F 13/10* (2013.01); *B05B 12/02* (2013.01); *A63F 2300/1012* (2013.01); *A63F 2300/69* (2013.01); *A63F 2300/8082* (2013.01)

(58) Field of Classification Search
CPC .................................................... G08C 17/00
See application file for complete search history.

(56) References Cited

U.S. PATENT DOCUMENTS

2006/0261179 A1* 11/2006 Davies ............... A01M 1/2044
239/34
2011/0241908 A1   10/2011 Han et al.

FOREIGN PATENT DOCUMENTS

KR   10-2011-0111204 A   10/2011
KR   10-2012-0046640 A   5/2012

* cited by examiner

*Primary Examiner* — Reginald Renwick

(57) ABSTRACT

Disclosed herein is a virtual world processing apparatus. The virtual world processing apparatus includes a gas sensor unit and an engine. The gas sensor unit obtains scent information in the real world. The engine receives information about the capabilities of the gas sensor unit from the gas sensor unit, and transmits the scent information obtained by the sensor unit to a virtual world or the real world.

16 Claims, 33 Drawing Sheets

```
<!--##############################################-->
<!--  E-nose-capabilityTypw" >
<!--##############################################-->
<complexType name="EnoseCapabilityType" >
    <complexContent>
        <extension base="cidl:SensorCapabilityBaseType" >
            <sequence>
                <element name="EachMonoChemicalSensor"
                 type="scdv:EachMonoChemicalSensorType"  minOccurs="0"  maxOccurs="unbounded"/>
                <element name="recognitionOdors" type="mpeg7:termReferenceType"
                 minOccurs="0"  maxOccurs="unbounded"/>
            </sequence>
            <attribute name="intensityUnit"  type="mpegvctunitType" use="optional"/>
            <attribute name="tempUnit"  type="mpegvctunitType" use="optional"/>
            <attribute name="warmupTime"  type="nonNegativeInteger" use="optional"/>
            <attribute name="recognitionTime"  type="nonNegativeInteger" use="optional"/>
            <attribute name="numOfRecognitionOdors"  type="nonNegativeInteger" use="optional"/>
            <attribute name="maxOperatingTemp"  type="nonNegativeInteger" use="optional"/>
            <attribute name="minOperatingTemp"  type="nonNegativeInteger" use="optional"/>
            <attribute name="maxOperatingHumid"  type="nonNegativeInteger" use="optional"/>
        </extension>
    </complexContent>
</complexType>

<complexType name="EachMonoChemicalSensorType">
    <attribute name="odorSensorTechnology"  type="mpeg7:termReferenceType"  use="optional"/>
    <attribute name="gasType"  type="mpeg7:termReferenceType"  use="optional"/>
    <attribute name="maxIntensity"  type="float"  use="optional"/>
    <attribute name="minIntensity"  type="float"  use="optional"/>
<complexType>
```

FIG. 2

| ENoseCapabilityType { | (Number of bits) | (Mnemonic) |
|---|---|---|
| EachMonoChemicalSensorFlag | 1 | bslbf |
| intensityUnitFlag | 1 | bslbf |
| tempUnitFlag | 1 | bslbf |
| warmupTimeFlag | 1 | bslbf |
| recognitionTimeFlag | 1 | bslbf |
| numOfRecognitionOdorsFlag | 1 | bslbf |
| maxOperatingTempFlag | 1 | bslbf |
| minOperatingTempFlag | 1 | bslbf |
| maxOperatingHumidFlag | 1 | bslbf |
| recognitionOdorsFlag | 1 | bslbf |
| SensorCapabilityBase | | SensorCapabilityBaseType |
| if(EachMonoChemicalSensorFlag){ | | |
| LoopScent | | bslbf |
| for(k=0; k<LoopScent; k++){ | | |
| EachMonoChemicalSensor[k] | | EachMonoChemical SensorType |
| } | | |
| } | | |
| if(intensityUnitFlag){ | | |
| intensityUnit | 8 | bslbf |
| } | | |
| if(tempUnitFlag){ | | |
| tempUnit | 8 | bslbf |
| } | | |
| if(warmupTimeFlag){ | | |
| warmupTime | 12 | uimsbf |

FIG. 3A

| | | |
|---|---|---|
| } | | |
| if(recognitionTimeFlag){ | | |
| recognitionTime | 12 | uimsbf |
| } | | |
| if(numOfRecognitionOdorsFlag){ | | |
| numOfRecognitionOdors | 8 | uimsbf |
| } | | |
| if(maxOperatingTempFlag){ | | |
| maxOperatingTemp | 6 | uimsbf |
| } | | |
| if(minOperatingTempFlag){ | | |
| minOperatingTemp | 6 | uimsbf |
| } | | |
| if(maxOperatingHumidFlag){ | | |
| maxOperatingHumid | 7 | uimsbf |
| } | | |
| if(recognitionOdorsFlag){ | | |
| for(k=0; k<numOfRecognitionOdors; k++){ | | |
| recognizedOdors[k] | 9 | bisbf |
| } | | |
| } | | |
| } | | |
| EachMonoChemicalSensorType{ | | |
| odorSensorTechnologyFlag | 1 | bslbf |
| gasTypeFlag | 1 | bslbf |
| maxIntensityFlag | 1 | bslbf |

FIG. 3B

| | | |
|---|---|---|
| minIntensityFlag | 1 | bslbf |
| if(odorSensorTechnologyFlag){ | | |
|     odorSensorTechnology | 4 | uimsbf |
| } | | |
| if(gasTypeFlag){ | | |
|     gasType | 16 | uimsbf |
| } | | |
| if(maxIntensityFlag){ | | |
|     maxIntensity | 32 | fsbf |
| } | | |
| if(minIntensityFlag){ | | |
|     minIntensity | 32 | fsbf |
| } | | |
| } | | |

FIG. 3C

Semantics of the EnoseCapabilityType:

| Name | Definition |
|---|---|
| EnoseCapabilityType | Tool for describing E-Nose capability. |
| EachMonoChemicalSensorFlag | This field, which is only present in the binary representation, signals the presence of the activation attribute. A value of " 1" means the attribute shall be used and " 0" means the attribute shall not be used. |
| IntensityUnitFlag | This field, which is only present in the binary representation, signals the presence of the activation attribute. A value of " 1" means the attribute shall be used and " 0" means the attribute shall not be used |
| tempUnitFlag | This field, which is only present in the binary representation, signals the presence of the activation attribute. A value of " 1" means the attribute shall be used and " 0" means the attribute shall not be used |
| warmupTimeFlag | This field, which is only present in the binary representation, signals the presence of the activation attribute. A value of " 1" means the attribute shall be used and " 0" means the attribute shall not be used |
| recognitionTimeFlag | This field, which is only present in the binary representation, signals the presence of the activation attribute. A value of " 1" means the attribute shall be used and " 0" means the attribute shall not be used |
| numOfRecognitionOdorsFlag | This field, which is only present in the binary representation, signals the presence of the activation attribute. A value of " 1" means the attribute shall be used and " 0" means the attribute shall not be used |
| maxOperatingTempFlag | This field, which is only present in the binary representation, signals the presence of the activation attribute. A value of " 1" means the attribute shall be used and " 0" means the attribute shall not be used |
| minOperatingTempFlag | This field, which is only present in the binary representation, signals the presence of the activation attribute. A value of " 1" means the attribute shall be used and " 0" means the attribute shall not be used |
| maxOperatingHumidFlag | This field, which is only present in the binary representation, signals the presence of the activation attribute. A value of " 1" means the attribute shall be used and " 0" means the attribute |

FIG. 4A

| | shall not be used |
|---|---|
| recognitionOdorsFlag | This field, which is only present in the binary representation, signals the presence of the activation attribute. A value of " 1" means the attribute shall be used and " 0" means the attribute shall not be used |
| EachMonoChemicalSensorType | Tool for describing a capability of individual sensors in E-Nose contained in the description. |
| intensityUnit | Specifies the unit of the description of maxIntensity and minIntensity as a reference to a classification scheme term provided by UnitTypeCS defined in A.2.1 of ISO/IEC 23005-6, if any unit other than the default unit of ppm is used. The reference to the classification scheme shall be done using the mpeg7:termReferenceType defined in 7.6 of ISO/IEC 15938-5:2003. |
| tempUnit | Specifies the unit of the description of maxOperatingTemp and minOperatingTemp as a reference to a classification scheme term provided by UnitTypeCS defined in A.2.1 of ISO/IEC 23005-6, if any unit other than the default unit of Celsius is used. The reference to the classification scheme shall be done using the mpeg7:termReferenceType defined in 7.6 of ISO/IEC 15938-5:2003. |
| warmupTime | Describes the warming-up time in term of SEC that have to be performed after power switch-on of E-Nose |
| recognitionTime | Describes the recognition time in term of SEC that is needed to recognize scents (or odours) |
| numOfRecognitionOdors | Describes the number of recognizable scents that can be recognized through E-Nose |
| recognizedOdors | Describes the list of scents that E-Nose can recognize. The type of the scent shall be described using the mpeg7:termReferenceType defined in 7.6 of ISO/IEC 15938-5:2003. A CS that may be used for this purpose is the ScentCS defined in A.2.4 of ISO/IEC 23005-6 |
| maxOperatingTemp | Describes the maximum temperature for the stable performance of E-Nose in term of Celsius. |
| minOperatingTemp | Describes the minimum temperature for the stable performance of E-Nose in term of Celsius. |
| maxOperatingHumid | Describes the maximum humidity for the stable performance of E-Nose in term of relative humidity (%) |

FIG. 4B

Semantics of the EachMonoChemicalSensorType :

| Name | Definition |
|---|---|
| EachMonoChemicalSensorType: | Tool for describing a capability of individual sensors contained in the description. |
| odorSensorTechnologyFlag | This field, which is only present in the binary representation, signals the presence of the activation attribute. A value of " 1" means the attribute shall be used and " 0" means the attribute shall not be used. |
| gasTypeFlag | This field, which is only present in the binary representation, signals the presence of the activation attribute. A value of " 1" means the attribute shall be used and " 0" means the attribute shall not be used. |
| maxIntensityFlag | This field, which is only present in the binary representation, signals the presence of the activation attribute. A value of " 1" means the attribute shall be used and " 0" means the attribute shall not be used |
| minIntensityFlag | This field, which is only present in the binary representation, signals the presence of the activation attribute. A value of " 1" means the attribute shall be used and " 0" means the attribute shall not be used |
| odorSensorTechnology | Describes the type of sensor according to manufacturing methods. The type of the scent shall be described using the mpeg7:termReferenceType defined in 7.6 of ISO/IEC 15938-5:2003. A CS that may be used for this purpose is the OdorSensorTechnologyCS defined in A.2.4 of ISO/IEC 23005-6 EXAMPLE urn:mpeg:mpeg-v:01-CI-OdorSensortechnology CS-NS:MOS_sensor would describe MOS type sensor. In the binary description, the following mapping table is used. <table><tr><td>odorSensorTechnology (4bit)</td><td>Term ID of odorSensorTechnologyCS</td></tr><tr><td>0000</td><td>MOS_sensor</td></tr><tr><td>0001</td><td>MOSFET_sensor</td></tr><tr><td>0010</td><td>CP_sensor</td></tr><tr><td>0011</td><td>SAW_sensor</td></tr><tr><td>0100</td><td>QMB_sensor</td></tr><tr><td>0101-1111</td><td>Reserved</td></tr></table> |
| maxIntensity | Describes the maximum measurable intensity of sensor in terms of ppm. |
| minIntensity | Describes the minimum measurable intensity of sensor in terms of ppm. |

FIG. 4C

```
<cidl:SensorDeviceCapability xsi:type="scdv:EnoseCapabilityType" id="Enose_01" intensityUnit="ppm"
tempUnit="celsius" warmupTime="600" recognitionTime="30" numOfRecognitionOdors="3"
maxOperatingTemp="60" minOperatingTemp="5" maxOperatingHumid="70">
    <scdv:EachMonoChemicalSensor odorSensorTechnology="urn:mpeg:mpeg-v:01_CI_
OdorSensorTechnologyCS_NS:MOS_sensor" gasType="urn:mpeg:mpeg-v:01-CI-GasCS-NS:VOC"
maxintensity="5000.0" minintensity="10.0" />
    <scdv:EachMonoChemicalSensor odorSensorTechnology="urn:mpeg:mpeg-v:01_CI_
OdorSensorTechnologyCS_NS:MOS_sensor" gasType="urn:mpeg:mpeg-v:01-CI-GasCS-NS:VOC"
maxintensity="1000.0" minintensity="1.0" />
    <scdv:recognitionOdors>urn:mpeg:mpeg-v:01_SI_ScentCS_NS:apple</scdv:recognitionOdors>
    <scdv:recognitionOdors>urn:mpeg:mpeg-v:01_SI_ScentCS_NS:rose</scdv:recognitionOdors>
    <scdv:recognitionOdors>urn:mpeg:mpeg-v:01_SI_ScentCS_NS:orange</scdv:recognitionOdors>
<cidl:SensorDeviceCapability>
```

FIG. 5

```xml
<ClassificationScheme uri="urn:mpeg:mpeg-v:01_SI_OdorSensorTechnologyCS_NS">
<Term termID="MOS_sensor">
    <Name xml:lang="en">Metal Oxide Semiconductor Sensor</Name>
    <Definition xml:lang="en">
        Describes metal oxide semiconductor sensor</Definition>
<Term>
<Term termID="MOSFET_sensor">
    <Name xml:lang="en"> Metal Oxide Semiconductor Field Effect Transistor sensor</Name>
    <Definition xml:lang="en">
        Describes metal oxide semiconductor field effect transistor sensor</Definition>
<Term>
<Term termID="CP_sensor">
    <Name xml:lang="en"> Conducting Organic Polymer sensor</Name>
    <Definition xml:lang="en">
        Describes Conducting organic polymer sensor</Definition>
<Term>
<Term termID="SAW_sensor">
    <Name xml:lang="en"> Surface Acoustic Wave sensor</Name>
    <Definition xml:lang="en">
        Describes surface acoustic Wave sensor</Definition>
<Term>
<Term termID="QMB_sensor">
    <Name xml:lang="en"> Quartz Microbalance sensor</Name>
    <Definition xml:lang="en">
        Describes quartz microbalance</Definition>
<Term>
<ClassificationScheme>
```

FIG. 6

| OdorSensorTechnologyCS | Term ID of OdorSensorTechnologyCS |
|---|---|
| 0000 | MOS_sensor |
| 0001 | MOSFET_sensor |
| 0010 | CP_sensor |
| 0011 | SAW_sensor |
| 0100 | QMB_sensor |
| 0101-1111 | Reserved |

FIG. 7

```
<!-- ########################################## -->
<!-- Definition of E-Nose sensed information Type -->
<!-- ########################################## -->
<complexType name="EnoseSensedinfoType">
    <complexContent>
        <extension base="iidl:SensedinfoBaseType">
            <sequence>
                <element name=="SensedScent" type="mpeg7:termReference type" minOccurse="0"/>
                <sequence>
                    <attribute name="intensity" type="float" use="optional"/>
                    <attribute name="unit" type="mpegvct : unitType" use="optional"/>
                </sequence>
            <extension>
        </complexContent>
<complexType>
```

FIG. 8

| EnoseSensedInfoType{ | Number of bits | Mnemonic |
|---|---|---|
| SensedScentFlag | 1 | bslbf |
| intensityFlag | 1 | bslbf |
| unitFlag | | bslbf |
| SensedInfoBase | | SensedInfoBaseType |
| if(SensedScentFlag){ | | |
|     ScensedScent | 16 | ScentType |
| } | | |
| if(intensityFlag){ | | |
|     intensity | 32 | fsbf |
| } | | |
| if(unitFlagFlag){ | | |
|     unit | 8 | initType |
| } | | |
| } | | |

FIG. 9

Semantics of the EnoseSensedInfoType:

| Name | Definition |
|---|---|
| EnoseSensedInfoType | Tool for describing a scent device command. |
| SensedScentFlag | This field, which is only present in the binary representation, signals the presence of device command attribute. A value of "1" means the attribute shall be used and "0" means the attribute shall not be used. |
| intensityFlag | This field, which is only present in the binary representation, signals the presence of device command attribute. A value of "1" means the attribute shall be used and "0" means the attribute shall not be used. |
| unitFlag | This field, which is only present in the binary representation, signals the presence of device command attribute. A value of "1" means the attribute shall be used and "0" means the attribute shall not be used. |
| SensedScent | Describes the sensed scent that shall be used as a reference to a classification scheme term using the mpeg7:termReferenceType defined in 7.6 of ISO/IEC 15938-5:2003. A CS that may be used for this purpose is the ScentCS defined in the Annex.2.4 of ISO/IEC 3005-6. The binary representation of the ScentCS is defined in A.x.x of ISO/IEC 23005-6. |
| intensity | Describes the intensity of sensed scent in terms of ppm |
| unit | Specifies the unit of the description of intensity as a reference to a classification scheme term provided by UnitTypeCS defined in A.2.1 of ISO/IEC 23005-6, if any unit other than the default unit of ppm is used. The reference to the classification scheme shall be done using the mpeg7:termReferenceType defined in 7.6 of ISO/IEC 15938-5:2003. |

FIG. 10

XML representation syntax

```
<!--##############################################_-->
<!--  Scent capability type                          -->
<!--##############################################_-->
<complexType name="ScentCapabilityType">
  <complexContent>
    <extension base="cidl:SensoryDeviceCapabilityBaseType">
      <sequence>
        <element name=="scentQuality" type="dcdv:scentQualityType" minOccurs="0" maxOccurs="unbounded"/>
      </sequence>
      <attribute name="intensityUnit" type="mpegvct:unitType" use="optional"/>
    </extension>
  </complexContent>
</complexType>

<complexType name="scentQualityType">
  <sequence>
    <attribute name="scentName" type="mpegvct : scentType" use="optional"/>
    <attribute name="maxintensity" type="nonNegativeInteger" use="optional"/>
    <attribute name="maxHedonicIntensity" type="nonNegativeInteger" use="optional"/>
    <attribute name="maxintensityType" type="mpeg7 : termReferenceType" use="optional"/>
    <attribute name="maxHedonicTone" type="integer" use="optional"/>
    <attribute name="intensityControlLevel" type="nonNegativeInteger" use="optional"/>
    <attribute name="secondOrderDelayTime" type="nonNegativeInteger" use="optional"/>
  </sequence>
<complexType>
```

FIG. 11

■Binary representation syntax

| ScentCapabilityType { | (Number of bits) | (Mnemonic) |
|---|---|---|
| scentQualityFlag | 1 | bslbf |
| intensityUnitFlag | 1 | bslbf |
| SensoryDeviceCapabilityBase | | SensoryDeviceCapabilityBaseType |
| if(ScentQualityFlag){ | | |
| LoopScent | | vluimsbf5 |
| for(k=0;k<LoopScent;k++){ | | |
| scentQuality[k] | | scentQualityType |
| } | | |
| } | | |
| if(intensityUnitFlag){ | | |
| intensityUnit | | unitType |
| } | | |
| } | | |
| | | |
| scentQualityType{ | | |
| scentNameFlag | 1 | bslbf |
| maxIntensityFlag | 1 | Bslbf |
| maxHedonicIntensityFlag | 1 | bslbf |
| maxIntensityTypeFlag | 1 | bslbf |
| maxHedonicToneFlag | 1 | bslbf |
| intensityControlLevelFlag | 1 | bslbf |
| secondOrderDelayTimeFlag | 1 | bslbf |
| secondOrderDelayTimeUnitFlag | 1 | bslbf |

FIG. 12A

| | | |
|---|---|---|
| if(scentNameFlag){ | | |
| scentName | | scentCSType |
| } | | |
| if(maxIntensityFlag){ | | |
| maxIntensity | 32 | fsbf |
| } | | |
| if(maxHedonicIntensityFlag){ | | |
| maxHedonicIntensity | 32 | Fsbf |
| } | | |
| if(maxIntensityTypeFlag){ | | |
| maxIntensityType | | intensityCategoryCSType |
| } | | |
| if(maxHedonicToneFlag){ | | |
| maxHedonicTone | 8 | simsbf |
| } | | |
| if(intensityControlLevelFlag){ | | |
| intensityControlLevel | 8 | uimsbf |
| } | | |
| if(secondOrderDelayTimeFlag){ | | |
| secondOrderDelayTime | 12 | uimsbf |
| } | | |
| } | | |

FIG. 12B

■ Semantics

Semantics of the scentCapabilityType:

| Name | Definition |
| --- | --- |
| ScentCapabilityType | Tool for describing a scent capability. |
| scentQulaityFlag | This field, which is only present in the binary representation, signals the presence of the activation attribute. A value of " 1" means the attribute shall be used and " 0" means the attribute shall not be used. |
| loopScent | This field, which is only present in the binary representation, specifies the number of Scent contained in the description. |
| IntensityUnitFlag | This field, which is only present in the binary representation, signals the presence of the activation attribute. A value of " 1" means the attribute shall be used and " 0" means the attribute shall not be used |
| scentQualityType | Tool for describing a capability of individual scents contained in the description. |
| intensityUnit | Specifies the unit of the description of maxIntensity and maxHedonicIntensity as a reference to a classification scheme term provided by UnitTypeCS defined in A.2.1 of ISO/IEC 23005-6, if any unit other than the default unit of ppm is used. The reference to the classification scheme shall be done using the mpeg7:termReferenceType defined in 7.6 of ISO/IEC 15938-5:2003. |

FIG. 13

Semantics of the scentQualityType:

| Name | Definition |
|---|---|
| ScentQualityType | Tool for describing a capability of individual scents contained in the description. |
| scentNameFlag | This field, which is only present in the binary representation, signals the presence of the activation attribute. A value of " 1" means the attribute shall be used and " 0" means the attribute shall not be used. |
| maxIntensityFlag | This field, which is only present in the binary representation, signals the presence of the activation attribute. A value of " 1" means the attribute shall be used and " 0" means the attribute shall not be used. |
| maxHedonicIntensityFlag | This field, which is only present in the binary representation, signals the presence of the activation attribute. A value of " 1" means the attribute shall be used and " 0" means the attribute shall not be used |
| maxHedonicToneFlag | This field, which is only present in the binary representation, signals the presence of the activation attribute. A value of " 1" means the attribute shall be used and " 0" means the attribute shall not be used |
| intensityControlLevelFlag | This field, which is only present in the binary representation, signals the presence of the activation attribute. A value of " 1" means the attribute shall be used and " 0" means the attribute shall not be used |
| secondOrderDelayTimeFlag | This field, which is only present in the binary representation, signals the presence of the activation attribute. A value of " 1" means the attribute shall be used and " 0" means the attribute shall not be used |
| scentName | Describes the list of scent that the perfumer can provide. The type of the scent shall be described using the mpeg7:termReferenceType defined in 7.6 of ISO/IEC 15938-5:2003. A CS that may be used for this purpose is the ScentCS defined in A.2.4 of ISO/IEC 23005-6<br><br>In the binary description, the following mapping table is used. |

FIG. 14A

| ScentCSType | Term ID of scentCS |
|---|---|
| 0000 | rose |
| 0001 | acacia |
| 0010 | chrysanthemum |
| 0011 | lilac |
| 0100 | mint |
| 0101 | jasmine |
| 0110 | pine_tree |
| 0111 | orange |
| 1000 | grape |
| 1001-1111 | Reserved | maxIntensity — Describes the maximum intensity that the perfumer can provide in terms of ppm to user about 1 meter from device.

maxHedonicIntensity — Describes intensity hedonic Tone that perfumer can provide at maximum hedonic tone.

The maximum hedonic tone of pleasant odors is +10. And The maximum hedonic tone of unpleasant odors is -10.

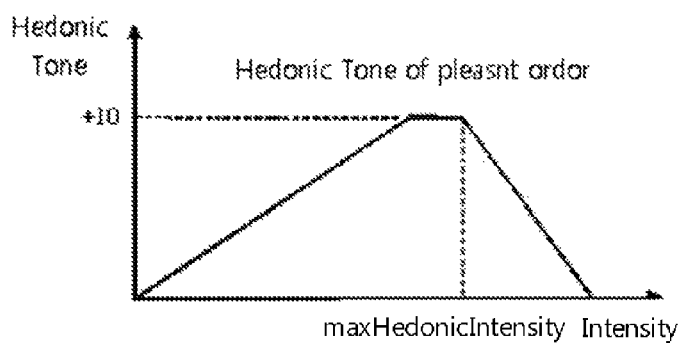

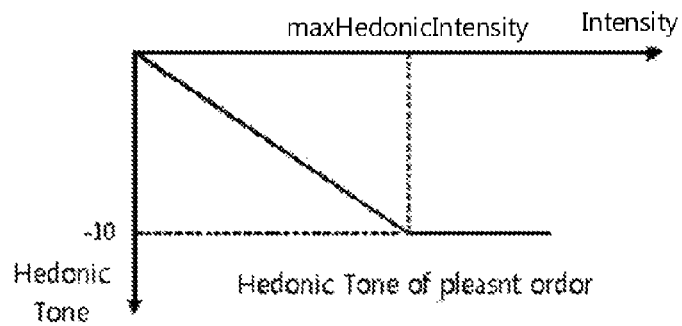

FIG. 14B

| | |
|---|---|
| maxIntensityType | Describes the maximum intensity reference scale that the perfumer can provide at *maxIntensity* or *maxHedonicIntensity*. The type of intensity shall be described using the mpeg7:termReferenceType defined in 7.6 of ISO/IEC 15938-5:2003. A CS that may be used for this purpose is the intensityCategoryCS defined in A.2.7 of ISO/IEC 23005-6<br><br>If maxIntensity < maxHedonicIntensity, then maxIntensityScale describes the maximum intensity reference scale that the perfumer can provide at maxHedonicIntensity. If not, maxIntensityScale describes the maximum intensity reference scale that the perfumer can provide at maxIntensity.<br><br>In the binary description, the following mapping table is used.<br><br>| intensityCategoryCSType | Term ID of IntensityCategory |<br>|---|---|<br>| 000 | No odor |<br>| 001 | Very light |<br>| 010 | Light |<br>| 011 | Moderate |<br>| 100 | Strong |<br>| 101 | Very Strong | |
| maxHedonicTone | Describes the maximum hedonic tone that the perfumer can provide in term of pleasantness and unpleasantness.<br><br>Hedonic tone describes the unpleasantness or pleasantness of an odor (ASCE 1995). It is rated using a scale that ranges from –10, which is unpleasant, to +10, which is pleasant. Neutral odors are recorded as zero. Unpleasantness usually increases with odor intensity. Pleasant odors may increase in pleasantness with odor intensity at low intensities but become less pleasant and even unpleasant at relatively high intensities |
| intensityControlLevel | Describes the number of intensity levels of the scent that the device can provide in between zero and maximum intensity |
| secondOrderDelayTime | Describes the delay time for a device to reach user at interval of one meter from device since it receives a command and is activated in the unit of millisecond (ms). |

FIG. 14C 1.4 Examples

This example shows the description of a scent device capability with the following semantics. The Scent Device has two scents. This device takes 0 milliseconds to start and 10 milliseconds to reach the target intensity. One have scentName="rose", maxIntensity=200(ppm), maxHedonicIntensity=300(ppm), maxIntensityType="strong", maxHedonicTone=6 , intensityControlLevel=10 and secondOrderDelayTime=1000(msec). The other scentName="orange", maxIntensity=300(ppm), maxHedonicIntensity=300(ppm), maxIntensityType="moderate", maxHedonicTone=5 , intensityControlLevel=10 and secondOrderDelayTime=1000(msec).

```
<cidl:ControlInfo>
  <cidl:SensoryDeviceCapabilityList>
      <cidl:SensoryDeviceCapability xsi:type="dcdv:ScentCapabilityType"|
      intensityUnit="urn:mpeg:mpef-v:01-CI-UnitTypeCS-NS:ppm
      firstOrderDelayTime="10">
        <dcdv:scentQuality>
           <dcdv:scentName>                  urn:mpeg:mpeg-v:01-SI-ScentCS-
NS:rose</dcdv:Scent>
           <dcdv:maxIntensity>200</dcdv:maxIntensity>
             <dcdv:maxHedonicIntensity>300</dcdv:maxHedonicIntensity>
             <dcdv:maxIntensityType>urn:mpeg:mpeg-v:01-SI-ScentCS-NS:strong
                     </dcdv:maxIntensityType>
             <dcdv:maxHedonicTone>6</dcdv:maxHedonicTone>
             <dcdv:intensityControlLevel>10</dcdv:intensityControlLevel>
             <dcdv:secondOrderDelayTime>1000</dcdv:secondOrderDelayTime>
          </dcdv:scentQuality>

<dcdv:scentQuality>
           <dcdv:scentName>                  urn:mpeg:mpeg-v:01-SI-ScentCS-
NS:orange</dcdv:Scent>
           <dcdv:maxIntensity>300</dcdv:maxIntensity>
             <dcdv:maxHedonicIntensity>300</dcdv:maxHedonicIntensity>
             <dcdv:maxIntensityType>urn:mpeg:mpeg-v:01-SI-ScentCS-NS:moderate
                     </dcdv:maxIntensityType>
             <dcdv:maxHedonicTone>5</dcdv:maxHedonicTone>
             <dcdv:intensityControlLevel>10</dcdv:intensityControlLevel>
             <dcdv:secondOrderDelayTime>1000</dcdv:secondOrderDelayTime>
          </dcdv:scentQuality>
      </cidl:SensoryDeviceCapability>
  </cidl: SensoryDeviceCapabilityList >
</cidl:ControlInfo>
```

FIG. 15

XML representation syntax

```
<!-- ################################################## -->
<!--     ScentPreference type                            -->
<!-- ################################################## -->
<complexType name="ScentType">
    <complexContent>
        <extension base="cidl:UserSensoryPreferenceBaseType">
            <sequence>
                <element name="userPreference" type="dcv:userPrefType" minOccurs="0" maxOccurs="unbounde"/>
            </sequence>
            <attribute name="inensityUnit" type="mpegvcu:unitTyep" use="optional"/>
        </extension>
    </complexContent>
</complexType>
<complexType name="userPrefType">
    <sequence>
        <attribbute name="userMaxIntensity"    type="nonNegativeInteger"        use="optional"/>
        <attribbute name="maxIntensityType"    type="mpeg7:termReferenceType"  use="optional"/>
        <attribbute name="maxHedonicTone"      type="integer"    use="optional"/>
    </sequence>
</complexType>
```

FIG. 16

■ Binary representation syntax

| ScentPrefType { | (Number of bits) | (Mnemonic) |
|---|---|---|
| userPreferenceFlag | 1 | bslbf |
| intensityUnitFlag | 1 | bslbf |
| UserSensoryPreferenceBase | | UserSensoryPreferenceBaseType |
| if(userPreferenceFlag){ | | |
|    LoopUserScent | | vluimsbf5 |
| for(k=0;k<LoopUserScent;k++){ | | |
|    userPreference[k] | | userPrefType |
|    } | | |
| } | | |
| if(intensityUnitFlag){ | | |
|    intensityUnit | | unitType |
| } | | |
| | | |
| userPrefType{ | | |
|    maxIntensityFlag | 1 | bslbf |
|    maxIntensityTypeFlag | 1 | bslbf |
|    maxHedonicToneFlag | 1 | bslbf |
|    if(userMaxIntensityFlag){ | | |
|       userMaxIntensity | 32 | fsbf |
|    } | | |
|    if(maxIntensityTypeFlag){ | | |
|       maxIntensityType | | IntensityCategoryCSType |
|    } | | |

FIG. 17A

| | | |
|---|---|---|
| if(maxHedonicToneFlag){ | | |
| maxHedonicTone | 8 | simsbf |
| } | | |
| } | | |

FIG. 17B

Semantics

Semantics of the scentPrefType:

| Name | Definition |
|---|---|
| ScentPrefType | Tool for describing a user preference on scent effect. |
| userPreferenceFlag | This field, which is only present in the binary representation, signals the presence of the activation attribute. A value of "1" means the attribute shall be used and "0" means the attribute shall not be used. |
| LoopUserScent | This field, which is only present in the binary representation, specifies the number of Scent contained in the description. |
| IntensityUnitFlag | This field, which is only present in the binary representation, signals the presence of the activation attribute. A value of "1" means the attribute shall be used and "0" means the attribute shall not be used |
| userPrefType | Tool for describing a user preference of individual scents on scent effect. |
| intensityUnit | Specifies the unit of the description of maxIntensity and maxHedonicIntensity as a reference to a classification scheme term provided by UnitTypeCS defined in A.2.1 of ISO/IEC 23005-6, if any unit other than the default unit of ppm is used. The reference to the classification scheme shall be done using the mpeg7:termReferenceType defined in 7.6 of ISO/IEC 15938-5:2003. |

FIG. 18

Semantics of the userPrefType:

| Name | Definition |
|---|---|
| userPrefType | Tool for describing a user preference of individual scents on scent effect. |
| userMaxIntensityFlag | This field, which is only present in the binary representation, signals the presence of the activation attribute. A value of " 1" means the attribute shall be used and " 0" means the attribute shall not be used. |
| maxIntensityTypeFlag | This field, which is only present in the binary representation, signals the presence of the activation attribute. A value of " 1" means the attribute shall be used and " 0" means the attribute shall not be used |
| maxHedonicToneFlag | This field, which is only present in the binary representation, signals the presence of the activation attribute. A value of " 1" means the attribute shall be used and " 0" means the attribute shall not be used |
| userMaxIntensity | Describes the maximum desirable intensity to determine the user preference in term of ppm.<br><br>Generally, userMaxIntensity can use maxIntensity of Scent CapabilityType. But, if maxIntensity of each scent exceed its own maxHedonicIntensity, userMaxIntensity should not exceed maxHedonicIntensity. |
| maxIntensityType | Describes the user intensity reference scale at userMaxIntensity. The type of intensity shall be described using the mpeg7:termReferenceType defined in 7.6 of ISO/IEC 15938-5:2003. A CS that may be used for this purpose is the IntensityCategoryCS defined in A.2.? of ISO/IEC 23005-6<br>In the binary description, the following mapping table is used.<br><br>| intensityCategoryCSType | Term ID of IntensityCategory |<br>|---|---|<br>| 000 | No odor |<br>| 001 | Very light |<br>| 010 | Light |<br>| 011 | Moderate | |

FIG. 19A

| | 100 | Strong |
|---|---|---|
| | 101 | Very Strong |

| | |
|---|---|
| maxHedonicTone | Describes the user hedonic tone at userMaxIntensity in term of pleasantness and unpleasantness.<br><br>Hedonic tone describes the unpleasantness or pleasantness of an odor (ASCE 1995). It is rated using a scale that ranges from −10, which is unpleasant, to +10, which is pleasant. Neutral odors are recorded as zero. Unpleasantness usually increases with odor intensity. Pleasant odors may increase in pleasantness with odor intensity at low intensities but become less pleasant and even unpleasant at relatively high intensities |

FIG. 19B

2.4 Examples

This example shows the description of a user preference with the following semantics. The Scent Device has two scents. The user feel that the first scent have maxIntensityType="very strong" and maxHedonicTone=7 at userMaxIntensity=200(ppm). And, the user feel that the second scent have maxIntensityType="moderate" and maxHedonicTone=6 at userMaxIntensity=300(ppm).

```
<cidl:ControlInfo>
  <cidl:UserSensoryPreferenceList>
    <cidl:USPreference xsi:type="dcdv:ScentPrefType"
    intensityUnit="urn:mpeg:mpef-v:01-CI-UnitTypeCS-NS:ppm">
      <dcdv:userPreference>
        <dcdv:userMaxIntensity>200</dcdv:userMaxIntensity>
        <dcdv:maxIntensityType>urn:mpeg:mpeg-v:01-SI-ScentCS-NS:very strong
        </dcdv:maxIntensityType>
        <dcdv:maxHedonicTone>7</dcdv:maxHedonicTone>
      </dcdv:userPreference>
      <dcdv:userPreference>
        <dcdv:userMaxIntensity>300</dcdv:userMaxIntensity>
        <dcdv:maxIntensityType>urn:mpeg:mpeg-v:01-SI-ScentCS-NS:moderate
        </dcdv:maxIntensityType>
        <dcdv:maxHedonicTone>6</dcdv:maxHedonicTone>
      </dcdv:userPreference>
    </cidl:USPreference>
  </cidl:UserSensoryPreferenceList>
</cidl:ControlInfo>
```

FIG. 20

XML representation syntax

```
<!--##############################################-->
<!--   Deinition of DCV Scent Type            -->
<!--##############################################-->
<complexType name="ScentType">
    <complexContent>
        <extension base="iidl:DeviceCommandBaseType">
            <attribute name="scent" type="mpeg7:termReferenceType" use="optional"/>
            <attribute name="intensity" type="integer" use="optional"/>
            <attribute name="duration" type="float"/>
        </extension>
    </complexContent>
</complexType>
```

FIG. 21

■Binary representation syntax

| ScentType{ | Number of bits | Mnemonic |
|---|---|---|
| scentFlag | 1 | bslbf |
| intensityFlag | 1 | bslbf |
| durationFlag | 1 | bslbf |
| DeviceCommandBase | | DeviceCommandBaseType |
| if(scentFlag){ | | |
| scent | 16 | bslbf |
| } | | |
| if(intensityFlag){ | | |
| intensity | 32 | fsbf |
| } | | |
| if(durationFlag){ | | |
| duration | 8 | uimsbf |
| } | | |
| } | | |

FIG. 22

■Semantics

Semantics of the scentType:

| Name | Definition |
|---|---|
| ScentType | Tool for describing a scent device command. |
| scentFlag | This field, which is only present in the binary representation, signals the presence of device command attribute. A value of "1" means the attribute shall be used and "0" means the attribute shall not be used. |
| intensityFlag | This field, which is only present in the binary representation, signals the presence of device command attribute. A value of "1" means the attribute shall be used and "0" means the attribute shall not be used. |
| durationFlag | This field, which is only present in the binary representation, signals the presence of device command attribute. A value of "1" means the attribute shall be used and "0" means the attribute shall not be used. |
| scent | Describes the scent that shall be used as a reference to a classification scheme term using the mpeg7:termReferenceType defined in 7.6 of ISO/IEC 15938-5:2003. A CS that may be used for this purpose is the ScentCS defined in the Annex 2.4 of ISO/IEC 3005-6. The binary representation of the ScentCS is defined in A.x.x of ISO/IEC 23005-6. |
| intensity | Describes the intensity of the scent effect in percentage with respect to the maximum intensity described in the device capability. If the intensity is not specified, this command shall be interpreted as turning on at the maximum intensity |
| duration | Describes the operational time of the scent device to send out a scent. |
| DeviceCommandBase | Provides the topmost type of the base type hierarchy which each individual device command can inherit. |

FIG. 23

3.4 Examples

This example shows the description of a device command of scent effect with the following semantics. The identifier for this command is "scent01" and the identifier for the sprayer device for which this command is issued is "scentdevice01". The intensity shall be 30% of the maximum intensity of "scentdevice01". The scent is defined to be the scent of acacia according to the definition of ScentCS of A.2.4 of ISO/IEC 3005-6. The operational time of the scent device is 5 sec.

```
<iidl:InteractionInfo>
    <iidl:DeviceCommandList>
        <iidl:DeviceCommand xsi:type="dcv:ScentType" id="scent01"
            deviceIdRef="scentdevice01"          activate="true"
            intensity="30"
            scent="urn:mpeg:mpeg-v:01-SI-ScentCS-NS:acacia"
            duration="5">
            <iidl:TimeStamp     xsi:type="mpegvct:AbsoluteTimeType"
            absTime="1:30:23"/>
        </iidl:DeviceCommand>
    </iidl:DeviceCommandList>
</iidl:InteractionInfo>
```

FIG. 24

VIRTUAL WORLD PROCESSING APPARATUS

CROSS REFERENCE TO RELATED APPLICATIONS

This application claims the benefits of Korean Patent Application Nos. 10-2012-0116414, 10-2012-0116416, and 10-2013-0071830, filed on Oct. 19, 2012, Oct. 19, 2012, and Jun. 21, 2013, respectively, which are hereby incorporated by reference in their entirety into this application.

BACKGROUND OF THE INVENTION

1. Technical Field

The present invention relates generally to a method of, in an MPEG-V based virtual reality system, representing the capabilities of a gas sensor and a scent emission device and representing a detected scent for the purpose of the transmission of information about the detected scent and, more particularly, to MPEG-V (Media Context and Control) technology that is capable of providing compatibility between a virtual world and the real world in a virtual reality system.

2. Description of the Related Art

In general, conventional virtual reality systems have focused chiefly on video and sound in order to simulate actual situations.

Korean Patent Application Publication No. 2012-0046640 discloses a virtual reality system using the visual sense. However, the visual sense alone is not sufficient to make persons feel that virtual reality is real, and thus it is necessary to provide a surrounding olfactory environment, as in the real world, in order to improve the sense of reality.

As an example, in a virtual reality situation in which a person is walking across a lilac garden, if he or she is allowed to smell the scent of lilacs, he or she can have a strong sense of reality.

As another example, in a virtual reality situation, if the delicate scent of roses is emitted when a young man having an ardent love presents the roses to his girl, the virtual reality situation will be more realistic.

As still another example, in a virtual reality situation in which a user sits comfortably in front of a fireplace and has fragrant coffee, if the scent of burning firewood and the aroma of the coffee are actually emitted, the user can be deeply immerged in the virtual reality situation.

In order to implement complete and vivid virtual reality as described above, a need for the construction of an environment that satisfies the olfactory sense in virtual reality systems is urgent.

SUMMARY OF THE INVENTION

Accordingly, the present invention has been made keeping in mind the above problems occurring in the conventional art, and an object of the present invention is to provide virtual world processing technology that, within the scope of MPEG-V, recognizes scents represent in the real world and transmits information about the recognized scents to a virtual world, thereby providing compatibility between the virtual world and the real world.

Another object of the present invention is to provide a method of, within the scope of MPEG-V, representing the capabilities of gas sensors that can detect scents present in the real world.

Another object of the present invention is to provide a method of, within the scope of MPEG-V, representing the capabilities of scent emission devices that emit scents to the real world based on information obtained by recognizing scents present in the real world or information about scents provided by a virtual world.

Still another object of the present invention is to provide a method of, within the scope of MPEG-V, commanding scent emission devices to emit scents.

Yet still another object of the present invention is to provide a method of, within the scope of MPEG-V, representing user preferences for scents that are emitted by scent emission devices.

In accordance with an aspect of the present invention, there is provided a virtual world processing apparatus, including a gas sensor unit configured to obtain scent information in the real world; and an engine configured to receive information about the capabilities of the gas sensor unit from the gas sensor unit, and to transmit the scent information obtained by the sensor unit to a virtual world or the real world.

The gas sensor unit may transmit to the engine the maximum value of gas in parts per million (ppm) that can be detected by the gas sensor unit.

The gas sensor unit may transmit to the engine the minimum value of gas in ppm that can be detected by the gas sensor unit.

The gas sensor unit may transmit to the engine via a 2-bit binary representation information about whether gas that is detected by the gas sensor unit is present.

The gas sensor unit may transmit to the engine via a 16-bit binary representation information about the type of gas that is detected by the gas sensor unit.

In accordance with another aspect of the present invention, there is provided a virtual world processing apparatus, including an engine configured to receive scent information obtained by a gas sensor unit, and to control transmission of the scent information to a virtual world or the real world; and a scent emission device configured to emit one or more scents to the real world based on the scent information.

The scent emission device may transmit information about the capabilities of the scent emission device to the engine.

The scent emission device may transmit to the engine via an 8-bit binary representation a list of scents that can be emitted by the scent emission device.

The list of scents that can be emitted by the scent emission device includes at least one of the scent of roses, the scent of acacias, the scent of chrysanthemums, the scent of lilacs, the scent of mint, the scent of jasmine, the scent of pine trees, the scent of oranges and the scent of grapes.

The scent emission device may transmit to the engine a maximum intensity of scent in ml/h that can be emitted by the scent emission device.

The scent emission device may represent the intensity of scent that can be emitted by the scent emission device within a range from 0 to the maximum intensity, and may transmit information about the intensity to the engine.

The engine may receive from a user user preferences for the scents that are emitted by the scent emission device.

The engine may receive from the user via a list including "pleasant" or "unpleasant" user preferences for the scents that are emitted by the scent emission device.

The engine may receive from the user a desired maximum intensity of scent in milliliters/hours that is emitted by the scent emission device.

The engine may specify one or more types of scents that should be emitted by the scent emission device, and then controls the scent emission device.

The engine may specify the duration of scents that should be emitted by the scent emission device, and may then control the scent emission device.

The engine may specify the intensity of each of the scents that should be emitted by the scent emission device, and may then control the scent emission device.

In accordance with another aspect of the present invention, there is provided a virtual world processing apparatus, including an engine configured to receive scent information from a virtual world, and to control transmission of the scent information to another virtual world or a real world; and a scent emission device configured to emit one or more scents to the real world based on the scent information.

BRIEF DESCRIPTION OF THE DRAWINGS

The above and other objects, features and advantages of the present invention will be more clearly understood from the following detailed description taken in conjunction with the accompanying drawings, in which:

FIG. 2 is a diagram illustrating the XML representation syntax of an e-nose capabilities type;

FIGS. 3a, 3b and 3c are diagrams illustrating the binary representation syntax of the e-nose capabilities type;

FIGS. 4a, 4b and 4c are diagrams illustrating the semantics of the e-nose capabilities type;

FIG. 5 is a diagram illustrating the details of the e-nose capabilities type based on the semantics;

FIG. 6 is a diagram illustrating the XML representation syntax of an odor sensor technology CS;

FIG. 7 is a diagram illustrating the binary representation syntax of the odor sensor technology CS;

FIG. 8 is a diagram illustrating the XML representation syntax of an e-nose sensed info type;

FIG. 9 is a diagram illustrating the binary representation syntax of the e-nose sensed info type;

FIG. 10 is a diagram illustrating the semantics of the e-nose sensed info type;

FIG. 11 is a diagram illustrating the XML representation syntax of a scent capabilities type according to an embodiment of the present invention can be seen;

FIGS. 12a and 12b are diagrams illustrating the binary representation syntax of the scent capabilities type according to an embodiment of the present invention;

FIG. 13 is a diagram illustrating the semantics of the scent capabilities type according to an embodiment of the present invention;

FIGS. 14a to 14c are diagrams illustrating the semantics of a scent quality type according to an embodiment of the present invention;

FIG. 15 is a diagram illustrating a detailed description of the capabilities and specifications of a scent emission device according to an embodiment of the present invention;

FIG. 16 is a diagram illustrating the XML representation syntax of a scent preference type according to an embodiment of the present invention;

FIGS. 17a and 17b are drawings illustrating the binary representation syntax of the scent preference type according to an embodiment of the present invention;

FIG. 18 is a diagram illustrating the semantics of the scent preference type according to an embodiment of the present invention;

FIGS. 19a and 19b are diagrams illustrating the semantics of a scent preference type according to an embodiment of the present invention;

FIG. 20 is a diagram illustrating a detailed description of a user preference according to an embodiment of the present invention;

FIG. 21 is a diagram illustrating the XML representation syntax of a scent effect according to an embodiment of the present invention;

FIG. 22 is a diagram illustrating the binary representation syntax of the scent effect according to an embodiment of the present invention;

FIG. 23 is a diagram illustrating the semantics of the scent effect according to an embodiment of the present invention;

FIG. 24 is a diagram illustrating a detailed description of a command that directs a scent emission device to emit a scent according to an embodiment of the present invention.

DESCRIPTION OF THE PREFERRED EMBODIMENTS

The present invention will be described in detail with reference to the accompanying drawings. In the following description, repetitive descriptions and detailed descriptions of well-known functions and configurations that may make the gist of the present invention unnecessarily obscure will be omitted.

A virtual world processing apparatus for controlling information exchange between the real world and a virtual world according to an embodiment of the present invention will be described below.

Figure 1:
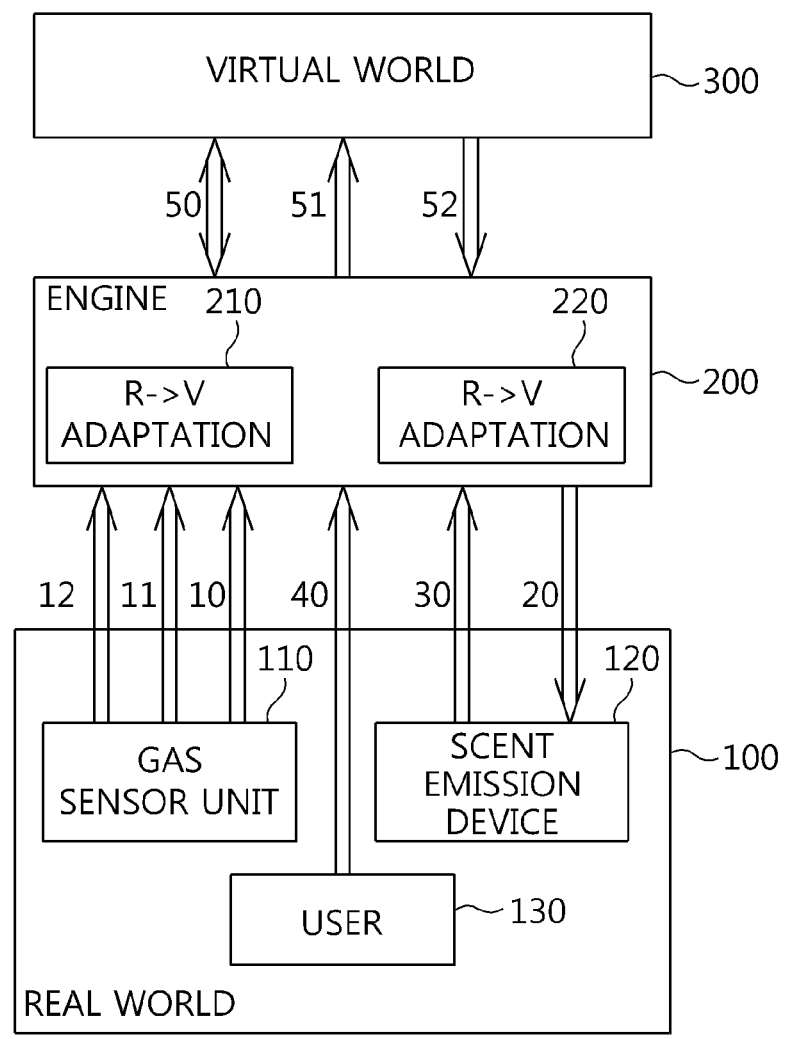
FIG. 1 is a diagram illustrating the structure of MPEG-V.

FIG. 1 is a diagram illustrating the structure of MPEG-V.

Referring to FIG. 1, in order to implement a virtual world processing apparatus according to an embodiment of the present invention, there are the real world 100, an engine 200, and a virtual world 300.

In this case, the real world 100 refers to actual space, whereas the virtual world 300 is a virtual space other than actual space and refers to virtual reality, such as a computer, a server or the like.

The real world 100 includes a gas sensor unit 110 configured to detect scent information about the real world 100 and a scent emission device 120 configured to emit a scent to the real world 100 based on scent information obtained in the virtual world 300 or the scent information detected by the gas sensor unit 110.

Furthermore, the virtual world 300 may include a scent emission media player that plays the virtual world 300 implemented by a program itself or content including scent emission information that may be implemented in the real world 100.

The gas sensor unit 110 according to an embodiment of the present invention may transmit information about the capabilities of the gas sensor unit 110 and information about a scent detected in the real world 100 to the engine 200 (10 and 12).

In this case, the capabilities of the gas sensor unit 110 refer to the types of scents and the intensities of scents that can be detected by the gas sensor unit 110.

Furthermore, the engine 200 may transmit (51) scent information received from the gas sensor unit 110 to the virtual world 300, and may receive (52) scent information provided by the virtual world 300.

The scent emission device 120 may transmit (30) information about the capabilities of the scent emission device 120 to the engine 200, and may perform a function of emitting a scent to the real world 100 in compliance with the scent emission command (20) of the engine 200. In this case, the capabilities of the scent emission device 120 refer to the types of scents and the intensities of scents that can be emitted by the scent emission device 120.

Furthermore, the engine 200 may receive (40) a preference for each scent emitted by the scent emission device from a user 130 who is present in the real world 100.

The present invention addresses a technology for compatibility between the real world 100 and the virtual world 300. In connection with this, the engine 100 transmits information between the real world 100 and the virtual world 300.

In this case, a standard for forms of representation for the purpose of the transmission of information between the real world 100 and the virtual world 300 is required. The principal feature of the present invention is to provide the standard for forms of representation for the purpose of the transmission of information.

The gas sensor unit 110 will be described in greater detail below.

The gas sensor unit 100 can detect a scent that is present in the real world 100. The gas sensor unit 100 may include various sensors in order to more accurately detect scents that are present in the real world 100.

A representation method by which the gas sensor unit 100 transmits its capabilities to the engine 200 will now be described. In this case, a part in which the gas sensor unit 100 transmits its capabilities to the engine 200 is referred to as an e-nose capabilities type.

From FIG. 2, the Extensible Markup Language (XML) representation syntax of the e-nose capabilities type can be seen. From FIGS. 3a, 3b and 3c, the binary representation syntax of the e-nose capabilities type can be seen. From FIGS. 4a, 4b and 4c, the semantics of the e-nose capabilities type can be seen.

Referring to FIGS. 4a and 4b, the e-nose capabilities type includes "each mono chemical sensor flag," an "intensity unit flag," a "temperature unit flag," a "warm up time flag," a "recognition time flag," a "number of recognition odor flag," a "maximum operating temperature flag," a "minimum operating temperature flag," a "maximum operating humid flag," and a "recognition odors flag."

In this case, it can be seen that the flags are defined as being used when they have a value of 1 in terms of binary representation and not being used when they have a value of 0.

For example, referring to gas type flag of FIG. 4c, information about whether the gas detected by the gas sensor unit 110 is present is transmitted to the engine 200 using a 2-bit binary representation.

Referring to FIG. 3c, the gas sensor unit 110 may transmit information about a maximum value maxIntensity in parts per million (ppm) that can be detected by the gas sensor unit 110 to the engine 200.

Furthermore, the gas sensor unit 110 may transmit information about a minimum value minIntensity in ppm that can be detected by the gas sensor unit 110 to the engine 200.

From FIG. 5, the details of the e-nose capabilities type based on the semantics can be seen. From FIG. 6, the XML representation syntax of an odor sensor technology CS can be seen. In detail, in an embodiment for representing the capabilities of the gas sensor unit 110, id may be "Enose_01," the intensity unit may be "ppm," the temperature unit may be "Celsius," the warm-up time may be "600," the recognition time may be "30," the number of recognition odors may be "3," the maximum operating temperature may be "60," the minimum operating temperature may be "5," and the maximum operating humidity may be "70."

Furthermore, it can be seen that the maximum value maxIntensity in ppm that can be detected by the gas sensor unit 100 is "5000.0."

Furthermore, it can be seen that the minimum value minIntensity in ppm that can be detected by the gas sensor unit 100 is "10.0."

Moreover, the gas sensor unit 110 may transmit information about the type of gas detected by the gas sensor unit 110 to the engine using a binary representation.

An e-nose sensed info type is used to represent a scent that is detected by the gas sensor unit 110.

FIG. 8 is a diagram illustrating the XML representation syntax of an e-nose sensed info type. FIG. 9 is a diagram illustrating the binary representation syntax of the e-nose sensed info type. FIG. 10 is a diagram illustrating the semantics of the e-nose sensed info type.

In this case, each binary representation may be composed of 8 bits or 16 bits.

Referring to FIG. 14a, according to the scent CS type, the types of gases that are detected by the gas sensor unit 110 may be represented using binary representations.

For example, the scent of roses may be represented by "0000," the scent of acacias may be represented by "0001," the scent of chrysanthemums may be represented by "0010," the scent of lilacs may be represented by "0011," the scent of mint may be represented by "0100," the scent of jasmine may be represented by "0101," the scent of pine trees may be represented by "0110," the scent of oranges may be represented by "0111," the scent of grapes may be represented by "1000," and "1001" to "1111" may be reserved for other use.

Furthermore, the types of sensors that are included in the gas sensor unit 110 may be determined. Information about the types of sensors may be transmitted to the engine 200. A method of representing the types of sensors is referred to as odor sensor technology CS. Referring to FIG. 7, the binary representation syntax of odor sensor technology CS can be seen. In this case, the sensors of the odor sensor technology CS can be represented using four bits. "0000" represents a MOS sensor, "0001" represents a MOSFET sensor, "0010" represents a CP sensor, "0011" represents a SAW sensor, "0100" represents a QMB sensor, and the remaining 0101 and 1111 are not assigned and empty.

An operation in which the engine 200 receives scent information obtained from the gas sensor unit 110 and transmits the scent information to the virtual world 300 or real world 100 will be described below.

Furthermore, the scent emission device 120 that emits a scent to the real world 100 based on scent information will be described below.

The scent emission device 120 may transmit information about the capabilities of the scent emission device 120 to the engine 200. This transmission method is referred to as a scent capabilities type.

In this case, the scent emission device 120 may transmit a list of scents that can be emitted by the scent emission device 120 to the engine 200 using a 4- or 8-bit binary representation.

In greater detail, referring to FIG. 14a, in the scent CS type, the scent of roses may be represented by "0000," the scent of acacias may be represented by "0001," the scent of chrysanthemums may be represented by "0010," the scent of lilacs may be represented by "0011," the scent of mint may be represented by "0100," the scent of jasmine may be represented by "0101," the scent of pine trees may be represented by "0110," the scent of oranges may be represented by "0111," the scent of grapes may be represented by "1000," and "1001" to "1111" may be reserved for extra use.

Furthermore, the scent emission device 120 may transmit information about the maximum intensity of a scent in ml/h that can be emitted by the scent emission device 120 to the engine 200.

Referring to FIG. 14c, a binary representation of the maximum intensity is defined as maxIntensity, and a binary representation of the maximum intensity is defined as maxIntensity.

In this case, "no scent" may be represented by "000," "very light" may be represented by "001," "light" may be represented by "010," "moderate" may be represented by "011," "strong" may be represented by "100," and "very strong" may be represented by "101."

More specifically, from FIG. 11, the XML representation syntax of the scent capabilities type according to an embodiment of the present invention can be seen. From FIGS. 12a and 12b, the binary representation syntax of the scent capabilities type according to an embodiment of the present invention can be seen. From FIG. 13, the semantics of the scent capabilities type according to an embodiment of the present invention can be seen. From FIGS. 14a to 14c, the semantics of a scent quality type according to an embodiment of the present invention can be seen.

From FIG. 15, a detailed description of the capabilities of the scent emission device 120 according to an embodiment of the present invention can be seen. Referring to the detailed description of FIG. 15, the scent emission device 120 may emit two types of scents. The scent emission device 120 emits the scents for a period from 0 milliseconds to 10 milliseconds. Furthermore, one of the two scents is the scent of roses. The maximum intensity maxintensity is 200 ppm, the maximum preference intensity maxHedonicintensity is 300 ppm, and the maximum intensity type is "strong." Furthermore, the maximum hedonic tone has a value of 6, and the intensity control level has a value of 10. Furthermore, it can be seen that the second order delay time is 1000 milliseconds. The remaining scent is the scent of oranges. The maximum intensity maxintensity is 300 ppm, the maximum preference intensity maxHedonicintensity is 300 ppm, and the maximum intensity type is "moderate." Furthermore, the maximum hedonic tone has a value of 5, and the intensity control level has a value of 10. Furthermore, it can be seen that the second order delay time is 1000 milliseconds.

Furthermore, the engine 200 may receive a preference for a scent transmitted by the scent emission device 120 from the user 130.

FIG. 16 is a diagram illustrating the XML representation syntax of a scent preference type according to an embodiment of the present invention. FIGS. 17a and 17b are drawings illustrating the binary representation syntax of the scent preference type according to an embodiment of the present invention. FIG. 18 is a diagram illustrating the semantics of the scent preference type according to an embodiment of the present invention. FIGS. 19a and 19b are diagrams illustrating the semantics of a scent preference type according to an embodiment of the present invention. FIG. 20 is a diagram illustrating a detailed description of a user preference according to an embodiment of the present invention.

In this case, a representation method that is used to transmit the preference is referred to as a scent preference type.

More specifically, the engine 200 may receive the preference for a scent that is transmitted by the scent emission device 120 via a list including "pleasant" or "unpleasant."

The term "pleasant" refers to "preferring," and the term "unpleasant" refers to "not preferring."

When the engine 200 receives the preference for a scent transmitted by the scent emission device 120 as described above, the preference may be taken into account upon controlling the scent emission device 120.

Furthermore, the engine 200 may receive a desired maximum intensity in milliliter/hour for the scent transmitted by the scent emission device 120.

From FIG. 20, a detailed description of a user preference according to an embodiment of the present invention can be seen. In the example of FIG. 20, the scent emission device 120 emits two types of scents. In this case, if user Max Intensity=200 ppm when the user 130 smells a first scent, the user 130 determines the maximum intensity type to be "very strong" and the value of the maximum hedonic tone to be 7. Furthermore, if user max intensity=300 ppm when the user 130 smells a second scent, the user 130 determines the maximum intensity type to be "moderate" and the value of the maximum hedonic tone to be 6.

Furthermore, the engine 200 may specify and control the type of scent that should be emitted by the scent emission device 120.

In greater detail, referring to FIG. 14a, according to the scent CS type, the scent of roses may be represented by "0000," the scent of acacias may be represented by "0001," the scent of chrysanthemums may be represented by "0010," the scent of lilacs may be represented by "0011," the scent of mint may be represented by "0100," the scent of jasmine may be represented by "0101," the scent of pine trees may be represented by "0110," the scent of oranges may be represented by "0111," the scent of grapes may be represented by "1000," and "1001" to "1111" may be reserved for extra use.

A representation by which the engine 200 commands the scent emission device 120 will be described.

The representation by which the engine 200 commands the scent emission device 120 is referred to as a scent effect.

FIG. 21 is a diagram illustrating the XML representation syntax of a scent effect according to an embodiment of the present invention. FIG. 22 is a diagram illustrating the binary representation syntax of the scent effect according to an embodiment of the present invention. FIG. 23 is a diagram illustrating the semantics of the scent effect according to an embodiment of the present invention. FIG. 24 is a diagram illustrating a detailed description of a command that directs the scent emission device to emit a scent according to an embodiment of the present invention.

Furthermore, the engine 200 may specify the duration of scents that should be emitted by the scent emission device 120, and may then control the scent emission device.

More specifically, referring to FIG. 23, a description of the "duration" is given, and the "duration" refers to the period for which the scent emission device 120 continuously emits a scent.

Furthermore, the engine 200 may specify the intensity of a scent that should be emitted by the scent emission device 120, and may then control the scent emission device 120.

More specifically, referring to FIG. 23, a description of "intensity" is given, and the "intensity" refers to the intensity of a scent that is emitted by the scent emission device 120.

In greater detail, from FIG. 24, a detailed description of a command that directs the scent emission device 120 according to an embodiment of the present invention to emit a scent can be seen. Referring to the example of FIG. 24, the identifier of the corresponding command is "scent01," and the identifier of the scent emission device 120 to which the command is issued is "scent device 001." Furthermore, it can be seen that the intensity corresponds to 30% of the maximum value of "scentdevice001," the scent is defined as the scent of acacias and the operating duration of the scent emission device 120 is five seconds.

Furthermore, the engine 200 may transmit scent information detected by the gas sensor unit 110 to the virtual world 300. In this case, the virtual world 300 is applied to the scent information, and thus an effect corresponding to the e-nose sensed info type 12 corresponding to the scent of the real world 100 can be implemented in the virtual world 300.

In accordance with an aspect of the present invention, scent information (an effect event) generated in the virtual world 300 is embodied by the scent emission device 120 in the real world 100. This is achieved by transmitting the scent information (the effect event) generated in virtual world 300 to the engine 200.

Figure 25:
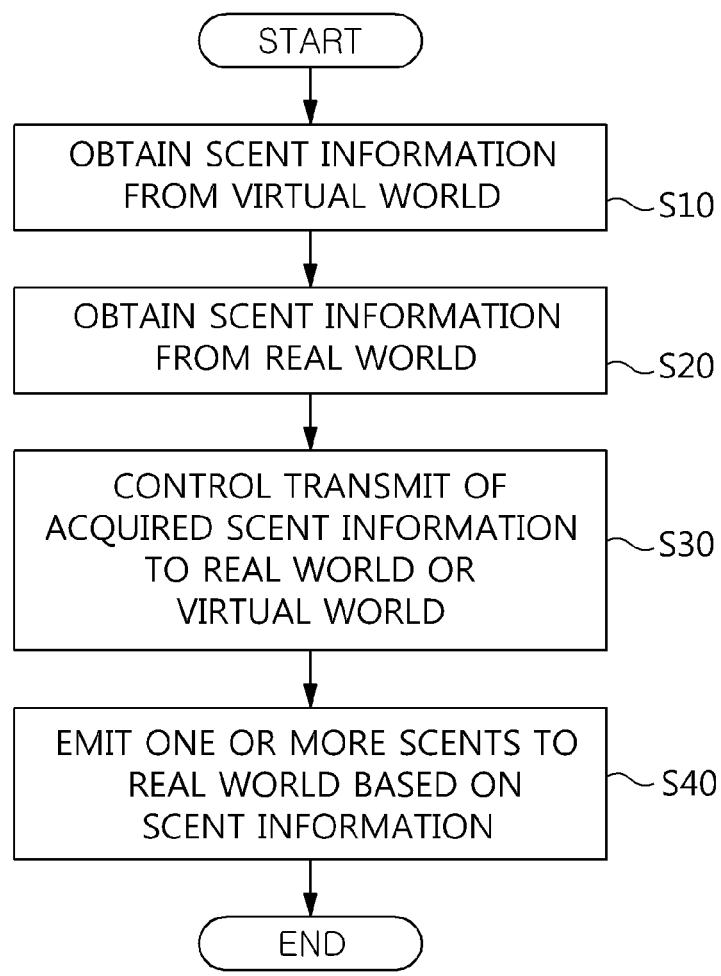
FIG. 25 is a flowchart of a virtual world processing method according to an embodiment of the present invention.

FIG. 25 is a flowchart of a virtual world processing method according to an embodiment of the present invention.

Referring to FIG. 25, a virtual world processing method according to an embodiment of the present invention includes step S10 of obtaining scent information from a virtual world, step S20 of obtaining scent information from the real world, step S30 of controlling the transmit of the acquired scent information to the real world or virtual world, and step S40 of emitting one or more scents to the real world based on the scent information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A virtual world processing apparatus, comprising:
a gas sensor unit configured to obtain scent information in a real world; and
an engine configured to receive information about capabilities of the gas sensor unit from the gas sensor unit, and to transmit the scent information obtained by the sensor unit to a virtual world or the real world,
wherein the gas sensor unit transmits to the engine a maximum value of gas in parts per million (ppm) that can be detected by the gas sensor unit.

2. The virtual world processing apparatus of claim 1, wherein the gas sensor unit transmits to the engine a minimum value of gas in ppm that can be detected by the gas sensor unit.

3. The virtual world processing apparatus of claim 2, wherein the gas sensor unit transmits to the engine via a 2-bit binary representation information about whether gas that is detected by the gas sensor unit is present.

4. The virtual world processing apparatus of claim 2, wherein the gas sensor unit transmits to the engine via a 16-bit binary representation information about a type of gas that is detected by the gas sensor unit.

5. A virtual world processing apparatus, comprising:
a gas sensor unit;
an engine configured to receive scent information obtained by the gas sensor unit, and to control transmission of the scent information to a virtual world or a real world; and
a scent emission device configured to emit one or more scents to the real world based on the scent information,
wherein the gas sensor unit transmits to the engine a maximum value of gas in parts per million (ppm) that can be detected by the gas sensor unit.

6. The virtual world processing apparatus of claim 5, wherein the scent emission device transmits information about capabilities of the scent emission device to the engine.

7. The virtual world processing apparatus of claim 6, wherein the scent emission device transmits to the engine via an 8-bit binary representation a list of scents that can be emitted by the scent emission device.

8. The virtual world processing apparatus of claim 7, wherein the list of scents that can be emitted by the scent emission device comprises at least one of a scent of roses, a scent of acacias, a scent of chrysanthemums, a scent of lilacs, a scent of mint, a scent of jasmine, a scent of pine trees, a scent of oranges and a scent of grapes.

9. The virtual world processing apparatus of claim 5, wherein the scent emission device transmits to the engine a maximum intensity of scent in ml/h that can be emitted by the scent emission device.

10. The virtual world processing apparatus of claim 9, wherein the scent emission device represents an intensity of scent that can be emitted by the scent emission device within a range from 0 to the maximum intensity, and transmits information about the intensity to the engine.

11. The virtual world processing apparatus of claim 5, wherein the engine receives from a user user preferences for the scents that are emitted by the scent emission device.

12. The virtual world processing apparatus of claim 11, wherein the engine receives from the user via a list including "pleasant" or "unpleasant" user preferences for the scents that are emitted by the scent emission device.

13. The virtual world processing apparatus of claim 12, wherein the engine receives from the user a desired maximum intensity of scent in milliliters/hours that is emitted by the scent emission device.

14. The virtual world processing apparatus of claim 5, wherein the engine specifies one or more types of scents to be emitted by the scent emission device, and then controls the scent emission device.

15. The virtual world processing apparatus of claim 5, wherein the engine specifies duration of scents to be emitted by the scent emission device, and then controls the scent emission device.

16. The virtual world processing apparatus of claim 5, wherein the engine specifies an intensity of each of the scents to be emitted by the scent emission device, and then controls the scent emission device.

* * * * *